(12) United States Patent
Khurange et al.

(10) Patent No.: US 11,169,960 B2
(45) Date of Patent: Nov. 9, 2021

(54) DATA TRANSFER APPLIANCE METHOD AND SYSTEM

(71) Applicants: Ashish Govind Khurange, Pune (IN); Smita Govind Khurange, Pune (IN); Suprya Sitaram Dere, Pune (IN); Dhiraj Ashok Akude, Pune (IN); Sachin Baban Durge, Pune (IN); Kuldeep Sureshrao Nagarkar, Pune (IN); Ravender Goyal, Saratoga, CA (US)

(72) Inventors: Ashish Govind Khurange, Pune (IN); Smita Govind Khurange, Pune (IN); Suprya Sitaram Dere, Pune (IN); Dhiraj Ashok Akude, Pune (IN); Sachin Baban Durge, Pune (IN); Kuldeep Sureshrao Nagarkar, Pune (IN); Ravender Goyal, Saratoga, CA (US)

( * ) Notice: Subject to any disclaimer, the term of this patent is extended or adjusted under 35 U.S.C. 154(b) by 520 days.

(21) Appl. No.: 15/870,828

(22) Filed: Jan. 12, 2018

(65) Prior Publication Data
US 2019/0005053 A1    Jan. 3, 2019

Related U.S. Application Data

(63) Continuation of application No. 15/638,207, filed on Jun. 29, 2017, now abandoned.

(51) Int. Cl.
*G06F 16/174*    (2019.01)
*G06F 16/11*    (2019.01)
(Continued)

(52) U.S. Cl.
CPC ............ *G06F 16/119* (2019.01); *G06F 3/067* (2013.01); *G06F 3/0614* (2013.01);
(Continued)

(58) Field of Classification Search
CPC ............ G06F 11/1453; G06F 11/1469; G06F 16/1748; G06F 16/16; G06F 3/0641; G06F 3/0647
See application file for complete search history.

(56) References Cited

U.S. PATENT DOCUMENTS

2013/0133051 A1\*  5/2013  Riemers ............... G06F 21/6218
                                                                                   726/7
2017/0168903 A1\*  6/2017  Dornemann ........ G06F 9/45558
(Continued)

*Primary Examiner* — Marcin R Filipczyk (57) ABSTRACT

In one aspect, a computer-implemented method useful for migrating hundreds of Terabyte to Petabyte of data to a cloud-computing environment with a data transfer appliance includes the step of providing a data transfer appliance, wherein the data transfer appliance comprises an operating system, one or more computing processing units (CPU's), a memory, and a data storage systems. The computer-implemented method includes the step of implementing data capture from a data storage system to the data transfer appliance. The computer-implemented method includes the step of storing the dedupe form of the data in the data transfer appliance. The computer-implemented method includes the step of shipping the data transfer appliance to a specified cloud-computing platform access point. The computer-implemented method includes the step of implementing data rehydration on the dedupe form of the data in the data transfer appliance.

8 Claims, 6 Drawing Sheets

(51) Int. Cl.
  *G06F 11/14* (2006.01)
  *G06F 16/176* (2019.01)
  *G06F 3/06* (2006.01)
  *G06F 16/16* (2019.01)
  *G06F 21/62* (2013.01)

(52) U.S. Cl.
  CPC ........ *G06F 3/0647* (2013.01); *G06F 11/1464* (2013.01); *G06F 16/16* (2019.01); *G06F 16/176* (2019.01); *G06F 16/1748* (2019.01); *G06F 3/0641* (2013.01); *G06F 11/1453* (2013.01); *G06F 11/1469* (2013.01); *G06F 21/62* (2013.01); *G06F 2201/80* (2013.01)

(56) References Cited

U.S. PATENT DOCUMENTS

2017/0277435 A1* 9/2017 Wadhwa ................ G06F 3/0605
2017/0315872 A1* 11/2017 Prabhu .................. G06F 16/122

\* cited by examiner

DATA TRANSFER APPLIANCE METHOD AND SYSTEM

BACKGROUND

Field of the Invention

This application relates generally to data storage, and more specifically to a system, article of manufacture and method of migrating hundreds of Terabyte to Petabyte of data to a cloud-computing environment with a data transfer appliance.

Description of the Related Art

An enterprise may wish to implement the copying and archiving of computer data so it may be used to restore the original after a data loss event. For example, the enterprise may wish to migrate servers and the server data to a cloud-computing environment Current methods may lack functionalities that enable the migration of servers to a cloud-computing environment. Many current methods can only be used to migrate archived data in the form of files. Accordingly, improvements to migrating applications to a cloud-computing environment can be implemented.

BRIEF SUMMARY OF THE INVENTION

In one aspect, a computer-implemented method useful for migrating hundreds of Terabyte to Petabyte of data to a cloud-computing environment with a data transfer appliance includes the step of providing a data transfer appliance, wherein the data transfer appliance comprises an operating system, one or more computing processing units (CPU's), a memory, and a data storage systems. The computer-implemented method includes the step of implementing data capture from a data storage system to the data transfer appliance. The computer-implemented method includes the step of storing the dedupe form of the data in the data transfer appliance. The computer-implemented method includes the step of shipping the data transfer appliance to a specified cloud-computing platform access point. The computer-implemented method includes the step of implementing data rehydration on the dedupe form of the data in the data transfer appliance.

BRIEF DESCRIPTION OF THE DRAWINGS

The Figures described above are a representative set, and are not exhaustive with respect to embodying the invention.

DESCRIPTION

Disclosed are a system, method, and article of manufacture for migrating data to a cloud-computing environment with a data transfer appliance. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application server can be, inter alia, a software framework that provides a generalized approach to creating an application-server implementation, regard to what the application functions are and/or the server portion of a specific implementation instance. The server's function can be dedicated to the execution of procedures (e.g. programs, routines, scripts) for supporting its applied applications. An application server can be an example of a physical server.

Backup image (or image) can include copies of programs, system settings, files, etc. It can be a complete system backup that can be used for restore operations.

Chunk can be a fragment of information.

Cloud computing can be computing that can involve a large number of computers connected through a communication network such as the Internet. Cloud computing can be a form of distributed computing over a network, and can include the ability to run a program or application on many connected computers at the same time.

Cloud storage can be a model of networked enterprise storage where data is stored in virtualized pools of storage which are generally hosted by third parties. Hosting companies can operate large data centers, and users can have data hosted by leasing storage capacity from said hosting companies. Physically, the resource can span across multiple servers and multiple locations.

Data deduplication (e.g. 'dedupe', 'deduplication') can refer to the elimination of redundant data.

Dedupe storage network can be represented in the form of a graph topology, where node represents dedupe storage node, and the directed edge represent the data replication path. In dedupe storage network data is replicated in dedupe preserving manner. A data chunk which is present at a dedupe storage node is never replicated to that same storage node by any other storage node in the dedupe storage network.

Fingerprint can uniquely identify data.

Offline data transfer appliance can be appliance which is plugged-in in customer's data center to capture the data, and rather than transferring the data to cloud over the WAN, this appliance is shipped to cloud platform to ingest data in the cloud storage.

Staging bucket can be an intermediate storage area where customer's captured data is stored in encrypted form. Only the user who has the encryption keys can decrypt the data in its original form.

Wide area network (WAN) can be a telecommunications network or computer network that extends over a large geographical distance.

Additional example definitions are provided herein.

Example Methods

Figure 1:
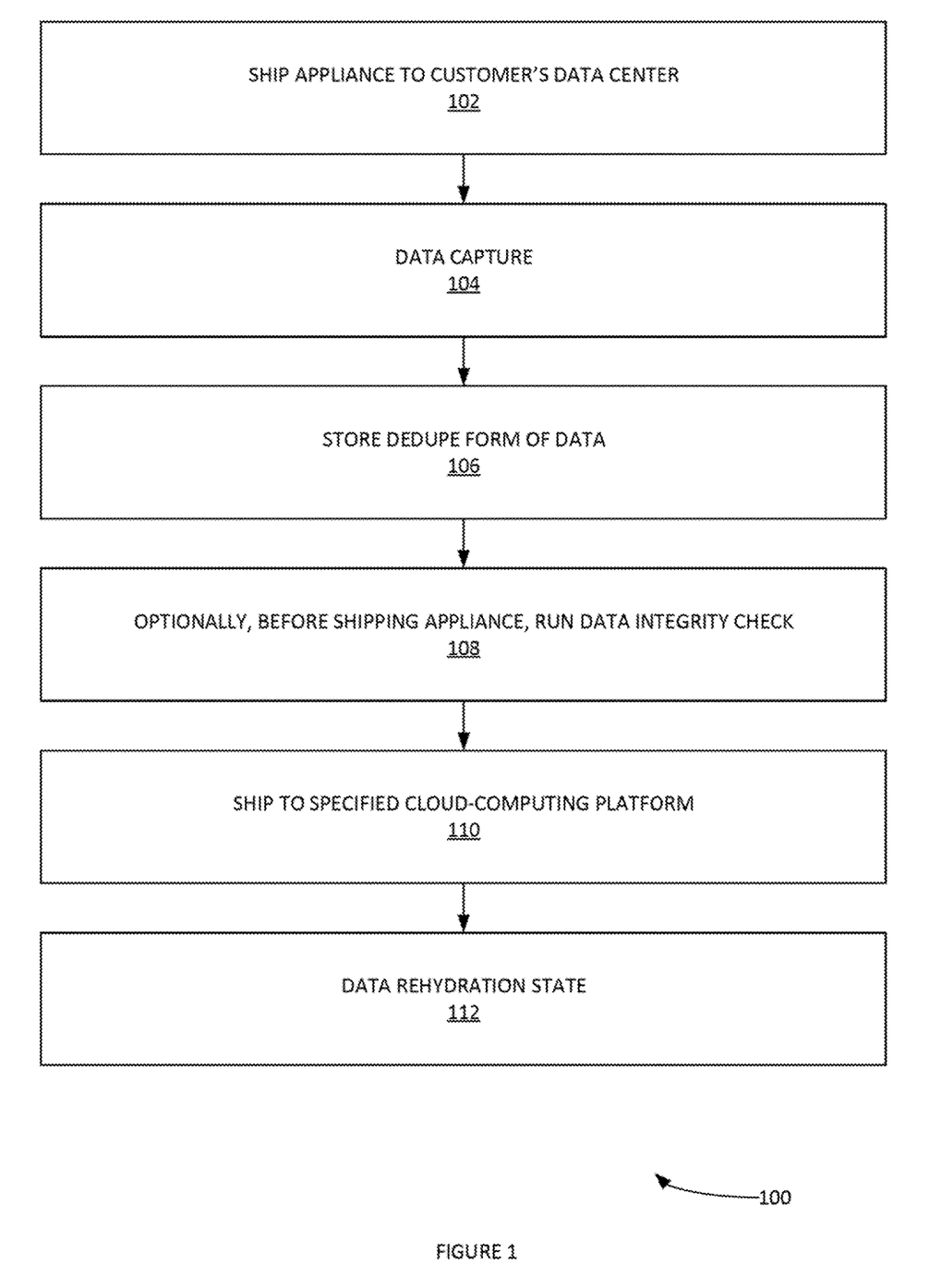
FIG. 1 illustrates an example process for migrating large amounts of data to a cloud-computing environment with an appliance, according to some embodiments.

FIG. 1 illustrates an example process 100 for migrating large amounts of data (hundreds of TB to PB) to a cloud-computing environment with a data-transfer appliance, according to some embodiments. The data-transfer appliance (hereafter 'appliance') can include specialized software (e.g. for implementing the various processes provided infra, etc.), an operating system, one or more CPU's, memory (e.g. RAM), data storage systems, etc. In some examples, the data storage systems can store a petabyte of data. The appliance can include various interfaces for plug-in network cables. The appliance can perform link aggregation. The appliance can assign itself an IP address. A customer can access/manage the appliance using a web browser via a portal.

More specifically, in step 102, process 100 can ship appliance to customer's data center. In step 104, process 100 can implement data capture 104. Two methods of data capture can be implemented. A first method can be workstation capture. With workstation capture, user downloads capture utility on the workstation using appliance web portal. In some examples, workstations can be both Windows® or Linux® based workstations. The capture utility will be used to capture the data available on the workstation. A second method of data capture can be appliance capture. Appliance capture method can export a Network File Share (NFS) SharePoint to appliance and mount to appliance as an NFS mountpoint. Then the appliance can capture the data from the NFS mountpoint. The capture method involves reading data from the storage attached to the workstation. The storage attached to the workstation may be DAS (directly attached storage), NAS (network attached storage), SAN (storage area network), or any other type. The capture utility iterates through the file system, identifies the files to be captured, reads the file data and streams it to the appliance. For each file, metadata such as name, size, file attributes, access control lists and any other such information is streamed to the appliance. The capture utility creates a catalog of files successfully captured and streamed to the appliance.

Figure 2:
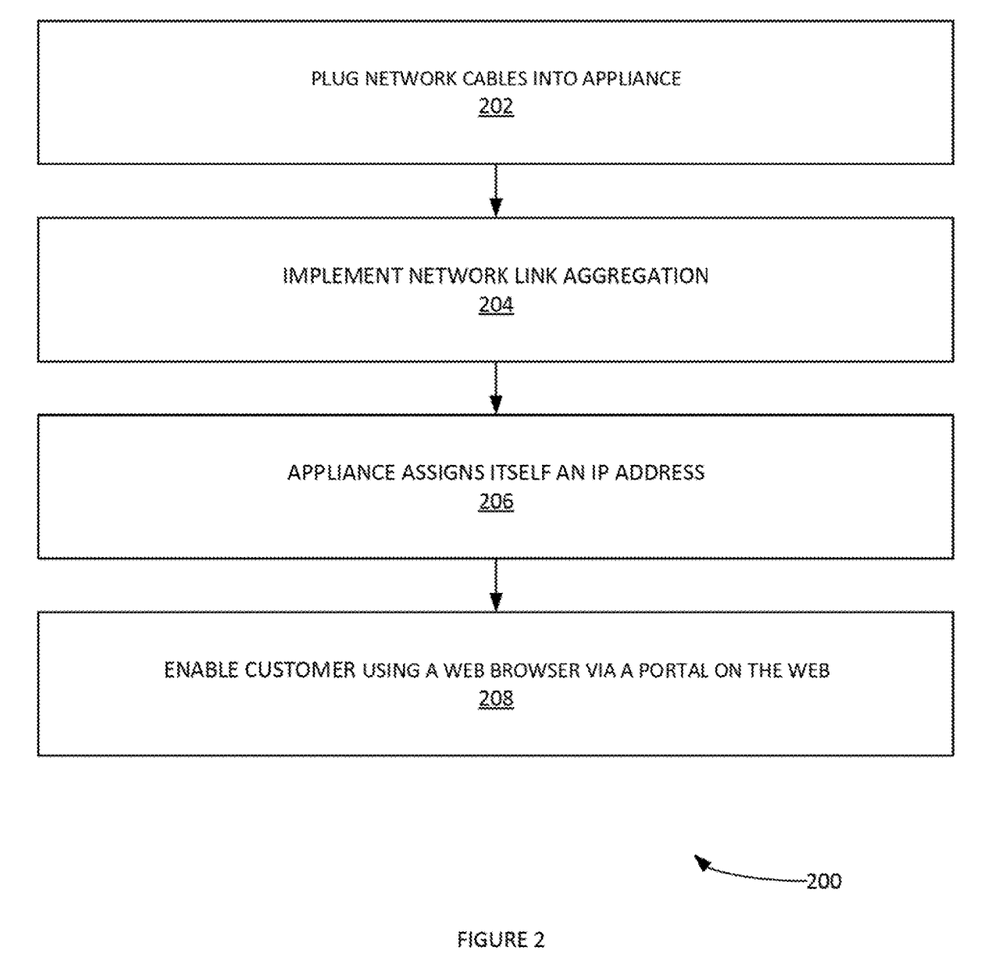
FIG. 2 illustrates an example process for accessing and/or managing an appliance, according to some embodiments.
Figure 3:
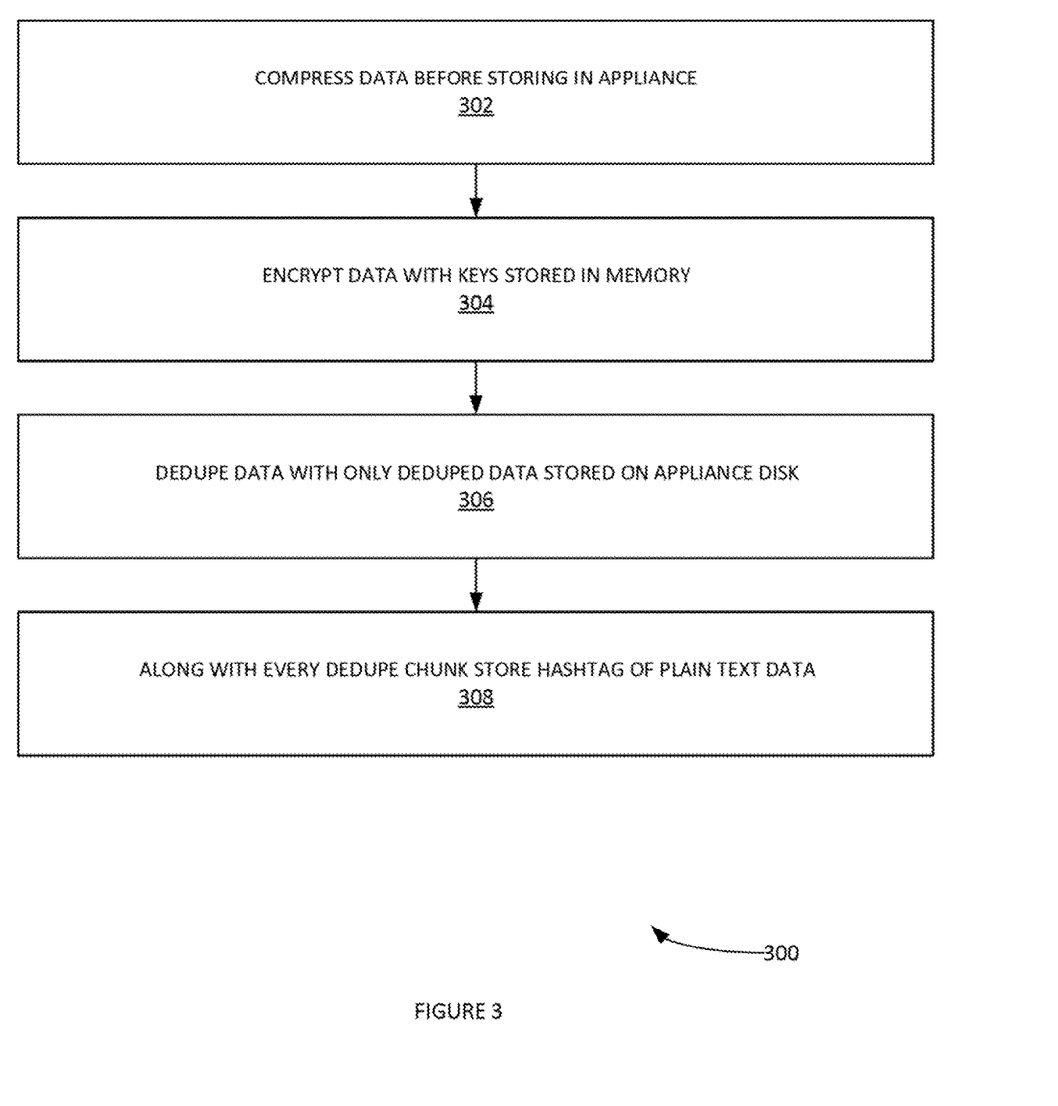
FIG. 3 illustrates an example process for data storage in an appliance using a data dedupe form of data, according to some embodiments.

FIG. 2 illustrates an example process 200 for accessing and/or managing an appliance, according to some embodiments. Process 200 can ship an appliance to customer's data center. In step 202, process 200 can plug network cables into appliance. In step 204, process 200 can implement network link aggregation. In step 206, the appliance assigns itself an IP address. In step 208, process 200 can enable customer to manage data migration using a web browser via a portal In step 106, process 100 can store dedupe form of data in the appliance. For example, FIG. 3 illustrates an example process 300 for data storage in an appliance using a data dedupe form of data, according to some embodiments. In step 302, process 300 can compress data before storing in appliance. In step 304, process 300 can encrypt data with keys stored in memory. The customer can provide the relevant keys which are not stored on the appliance but in memory such that they are not available after the appliance shut down. Accordingly, only someone with the encryption keys can recover data from appliance. In step 306, process 300 can dedupe data with only deduped data stored on appliance disk. In step 308, process 300 can, along with every dedupe chunk, store hashtag of plain text data 308. In some examples, the appliance data storage size can be from one hundred terabytes (100 TB) to one-half petabyte (0.5 PB). The dedupe process can enable more than one PB of data to be stored on the appliance. It is noted that along with every dedupe chunk, process 300 can also store a hashtag of plain text data. This hashtag is used in the data verification.

Figure 4:
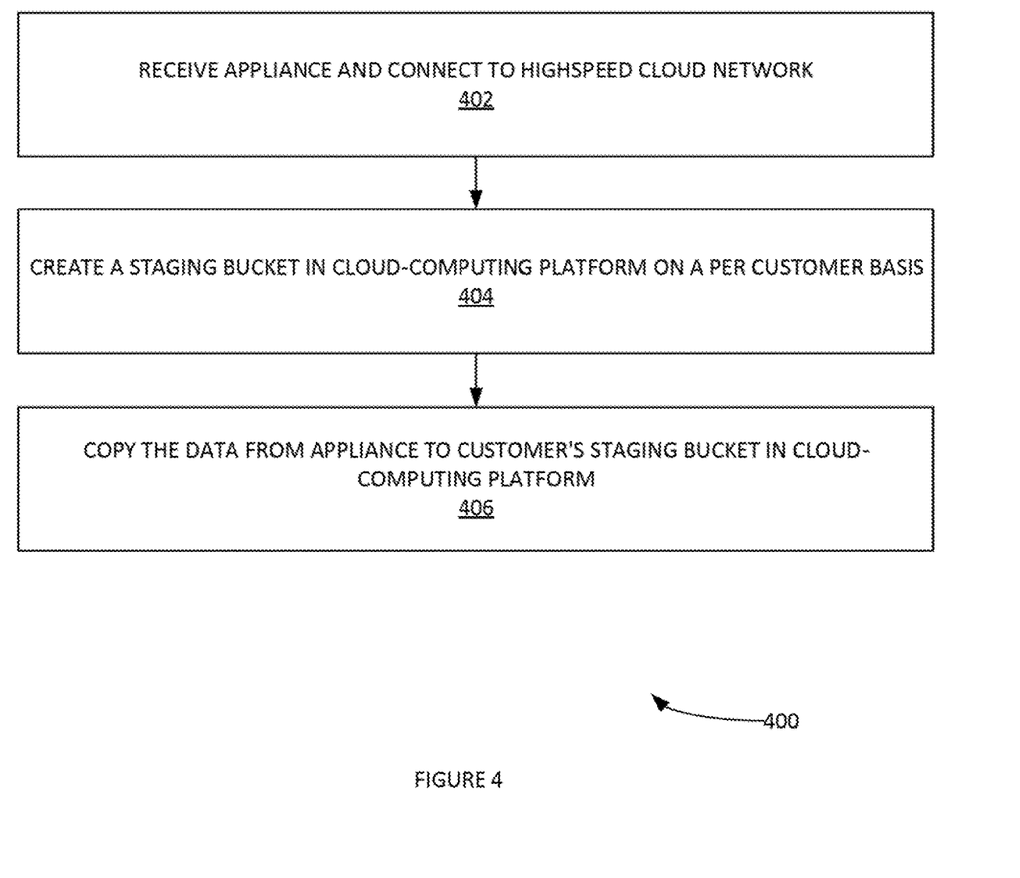
FIG. 4 illustrates an example process for shipping data to a cloud-computing platform from an appliance, according to some embodiments.

Returning to process 100, in step 108, optionally, before shipping appliance, process 100 can run data integrity check. For example, in FIG. 4 illustrates an example process 400 for shipping data to a cloud-computing platform from an appliance, according to some embodiments. In step 402, process 400 can receive appliance and connect to highspeed cloud network. In step 404, process 400 can create a staging bucket in cloud-computing platform on a per customer basis 404. In step 406, process 400 can copy the data (which is in encrypted, compressed and deduped form) from appliance to customer's staging bucket in cloud-computing platform.

Returning to process 100, in step 110, process 100 can ship appliance to a specified cloud-computing platform access point. This can be performed by a third party and/or internal data ingest service that receives the appliance and connects it to a highspeed cloud network. Process 100 can then copy the data to and copy to the specified customer's staging bucket in cloud-computing platform. This can be done without the encryption keys so the third party and/or internal data ingest service cannot determine meaning of the data. Step 110 can also create a staging bucket in the specified cloud-computing platform on a per customer basis. This can hold all the encrypted and compressed dedupe data such that a copy of the appliance is in cloud-based staging bucket.

Figure 5:
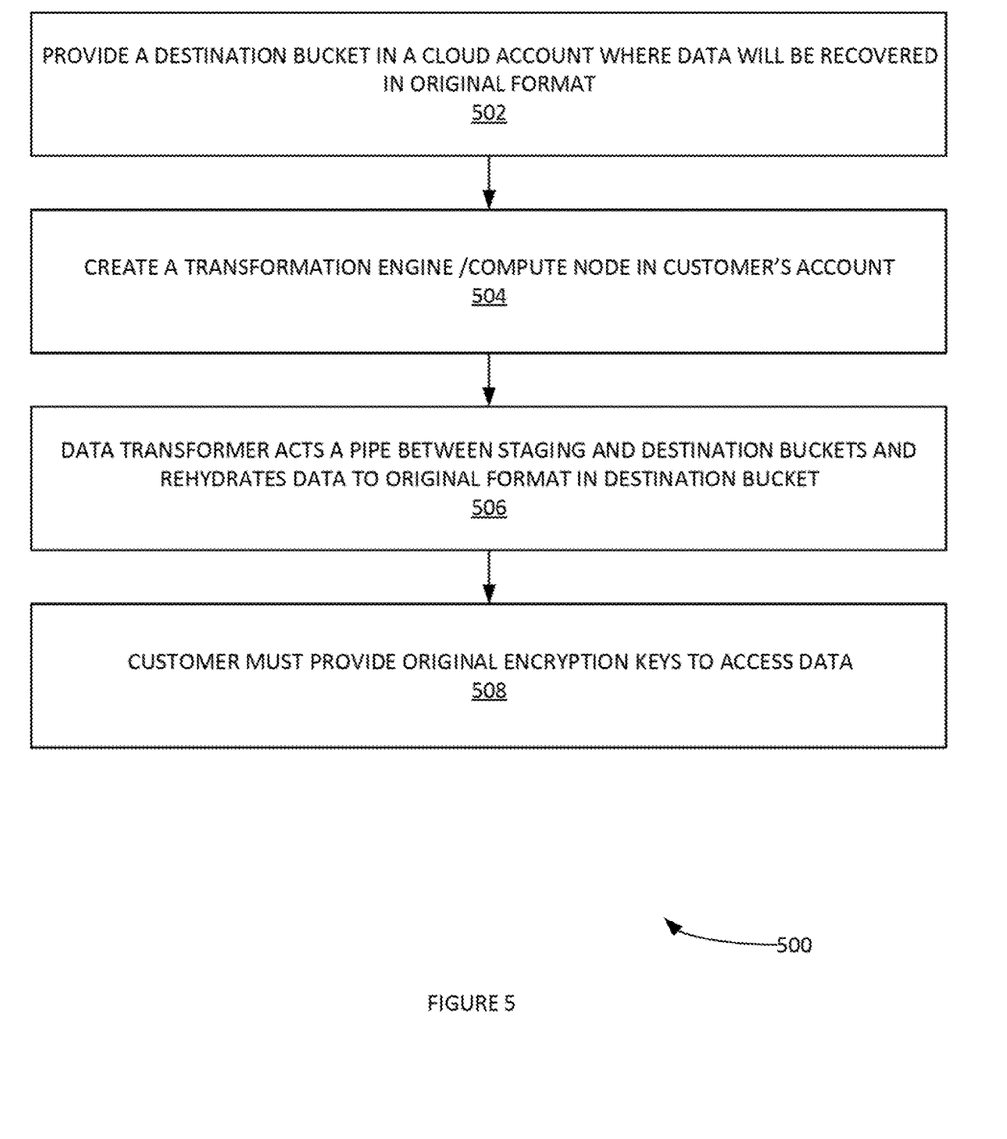
FIG. 5 illustrates an example process for data rehydration, according to some embodiments.

Returning to process 100, in step 112, process 100 can implement data rehydration. For example, in FIG. 5 illustrates an example process 500 for data rehydration, according to some embodiments. Data rehydration can decompress, decrypt and undedupe the data and recover the data in its original format. Process 500 can manage the staging bucket associated with the cloud account. The customer creates a destination bucket where wish to move the data in its original format. Process 500 can create a data transformation engine which is a compute node in customer's account as well. More specifically, in step 502, process 500 can provide a destination bucket in a cloud account. In step 504, process 500 can create a transformation engine/compute node in customer s account. In step 506, process 500 can utilize a data transformation engine to acts as a pipe between two buckets and rehydrate data to original format. In step 508, process 500 can require a customer to provide original encryption keys to access data. Process 500 can utilize customer-provided encryption keys. If the encryption keys don't match, the process 500 does not allow data rehydration.

Exemplary Computer Architecture and Systems

Figure 6:
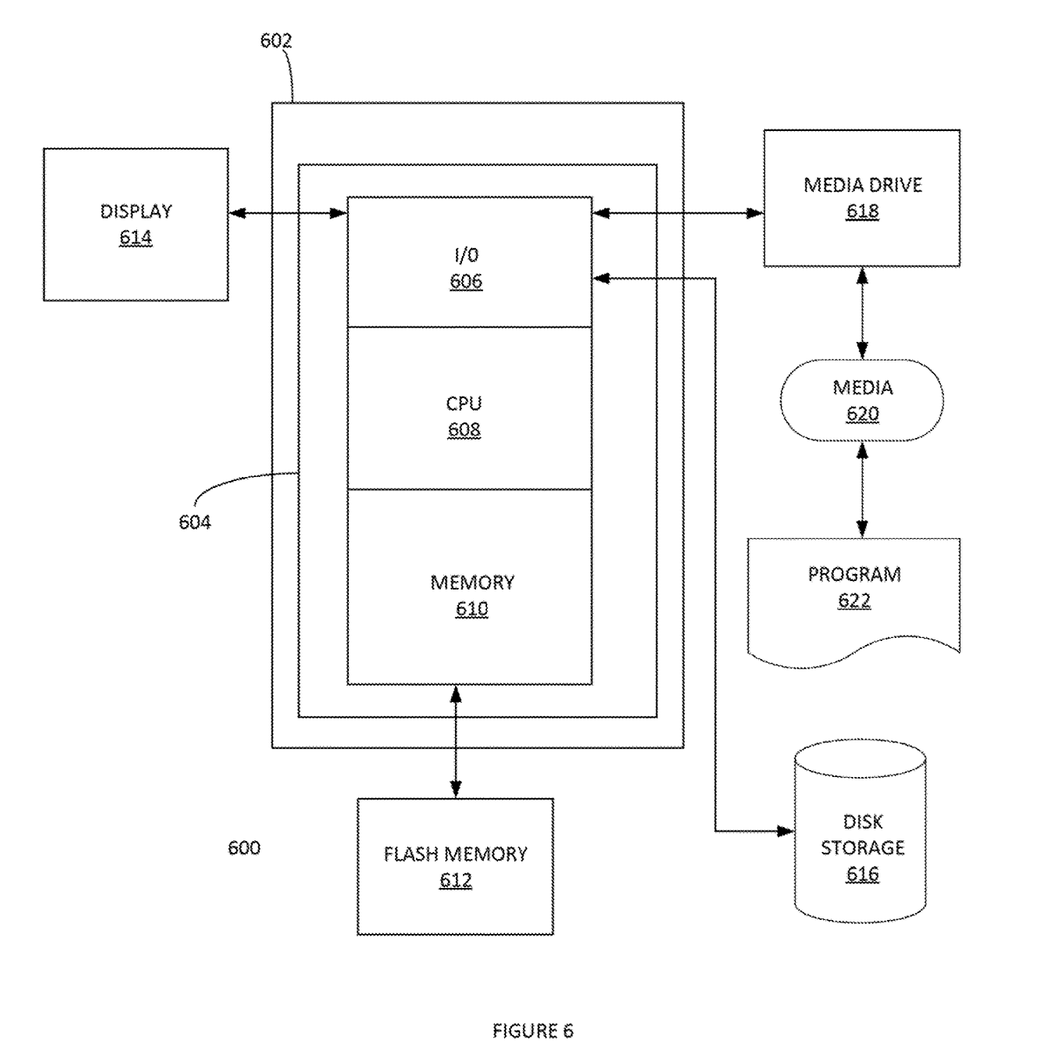
FIG. 6 depicts an exemplary computing system that can be configured to perform any one of the processes provided herein.

FIG. 6 depicts an exemplary computing system 600 that can be configured to perform any one of the processes provided herein. In this context, computing system 600 may include, for example, a processor, memory, storage, and I/O devices (e.g., monitor, keyboard, disk drive, Internet connection, etc.). However, computing system 600 may include circuitry or other specialized hardware for carrying out some or all aspects of the processes. In some operational settings, computing system 600 may be configured as a system that includes one or more units, each of which is configured to carry out some aspects of the processes either in software, hardware, or some combination thereof.

FIG. 6 depicts computing system 600 with a number of components that may be used to perform any of the processes described herein. The main system 602 includes a motherboard 604 having an I/O section 606, one or more central processing units (CPU) 608, and a memory section 610, which may have a flash memory card 612 related to it. The I/O section 606 can be connected to a display 614, a keyboard and/or other user input (not shown), a disk storage unit 616, and a media drive unit 618. The media drive unit 618 can read/write a computer-readable medium 620, which can contain programs 622 and/or data. Computing system 600 can include a web browser. Moreover, it is noted that computing system 600 can be configured to include additional systems in order to fulfill various functionalities. Computing system 600 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an Illustrative rather than a restrictive sense. In some embodiments, the machine-readable medium can be a non-transitory form of machine-readable medium.

What is claimed as new and desired to be protected by Letters Patent of the United States is:

1. A computer-implemented method useful for migrating hundreds of Terabyte to Petabyte of data to a cloud-computing environment with a data transfer appliance comprising:
   providing a data transfer appliance, wherein the data transfer appliance comprises an operating system, one or more computing processing units (CPU's), a memory, and a data storage systems;
   implementing data capture from a data storage system to the data transfer appliance, wherein the step of implementing data capture from a data storage system to the data transfer appliance further comprises:
      exporting a Network File Share (NFS) mountpoint to the data transfer appliance;
      mounting to the data transfer appliance as an NFS mountpoint; and
      capturing the data with the data transfer appliance from the NFS mountpoint;
   storing a dedupe form of the data in the data transfer appliance;
   physically shipping the data transfer appliance to a specified cloud-computing platform access point;
   receiving the data transfer appliance and connecting the data transfer appliance to a highspeed cloud network;
   creating a staging bucket in a cloud-computing platform on a per customer basis;
   copying the dedupe form of the data in the data transfer appliance from the data transfer appliance to a customer's staging bucket in the cloud-computing platform; and
   implementing data rehydration on the dedupe form of the data.

2. The computer-implemented method of claim 1, wherein the data storage system stores at least a Petabyte of data.

3. The computer-implemented method of claim 1, wherein the step of implementing data capture from a data storage system to the data transfer appliance further comprises:
   with a workstation, managing the download a capture utility on the workstation using a data-transfer appliance web portal, and
   wherein the capture utility is used to capture the data available on the workstation.

4. The computer-implemented method of claim 3, wherein the workstation comprises a Windows® and Linux®-based workstation.

5. The computer-implemented method of claim 1, wherein the step of storing the dedupe form of the data in the data transfer appliance further comprising:
   splitting the captured data into fixed size segments;

calculating the fingerprint, deduping based on fingerprint database;
compressing and encrypting the dedupe data chunk;
appending the fingerprint to the dedupe data chunk; and
storing the data chunk on the appliance.

6. The computer-implemented method of claim 1 further comprising:
before shipping the data transfer appliance, running a data integrity check on the data stored in dedupe form.

7. The computer-implemented method of claim 6 further comprising:
reading the dedupe chunk data;
decrypting the dedupe chunk data;
decompressing the dedupe chunk data;
calculating a fingerprint of the dedupe chunk data; and
comparing the dedupe chunk data with the fingerprint generated during data capture and stored at an end of dedupe data chunk.

8. The computer-implemented method of claim 1, wherein the step of implementing data rehydration on the dedupe form of the data further comprises:
decompressing the data;
decrypting the data;
undeduping the data to an original format of the data; and
storing the data in the specified cloud-computing platform.

* * * * *